(12) United States Patent
Lajewardi et al.

(10) Patent No.: US 10,247,219 B2
(45) Date of Patent: *Apr. 2, 2019

(54) SCREW-TYPE FASTENER

(71) Applicant: THE HILLMAN GROUP, INC., Cincinnati, OH (US)

(72) Inventors: Farhad Lajewardi, Toronto (CA); Michael K. Falkenstein, Oakville (CA)

(73) Assignee: THE HILLMAN GROUP, INC., Cincinnati, OH (US)

(*) Notice: Subject to any disclaimer, the term of this patent is extended or adjusted under 35 U.S.C. 154(b) by 123 days.

This patent is subject to a terminal disclaimer.

(21) Appl. No.: 15/408,507

(22) Filed: Jan. 18, 2017

(65) Prior Publication Data
US 2017/0122356 A1 May 4, 2017

Related U.S. Application Data

(63) Continuation of application No. 14/623,959, filed on Feb. 17, 2015, now Pat. No. 9,581,183.

(51) Int. Cl.
F16B 25/00 (2006.01)
F16B 25/10 (2006.01)

(52) U.S. Cl.
CPC .......... F16B 25/0052 (2013.01); F16B 25/00 (2013.01); F16B 25/0015 (2013.01); F16B 25/0057 (2013.01); F16B 25/0068 (2013.01); F16B 25/103 (2013.01)

(58) Field of Classification Search
CPC .............. F16B 25/0015; F16B 25/0052; F16B 25/0057; F16B 25/0068; F16B 25/103; F16B 25/00

USPC ........................................................ 411/386

See application file for complete search history.

(56) References Cited

U.S. PATENT DOCUMENTS

| | | |
|---|---|---|
| 1,151,861 A | 8/1915 | Brumback |
| 3,136,205 A | 6/1964 | Ansingh |
| 3,246,556 A | 4/1966 | Phipard, Jr. |
| 3,903,784 A | 9/1975 | Dekker |
| 4,323,326 A | 4/1982 | Okada et al. |
| 4,655,661 A | 4/1987 | Brandt |
| 4,697,969 A | 10/1987 | Sparkes |
| 5,249,882 A | 10/1993 | Nagoshi et al. |
| 5,516,248 A | 5/1996 | DeHaitre |
| 5,683,217 A | 11/1997 | Walther et al. |
| 5,722,376 A | 3/1998 | Sweeten |
| 5,827,030 A | 10/1998 | Dicke |
| 5,897,280 A | 4/1999 | Dicke |
| 6,015,252 A | 8/2000 | Lin |
| 6,106,208 A | 8/2000 | Lin |
| 6,152,666 A | 11/2000 | Walther et al. |
| 6,250,866 B1 | 6/2001 | Devine |
| 6,332,741 B1 | 12/2001 | Janusz |
| 6,394,725 B1 | 5/2002 | Dicke |
| 6,402,448 B1 | 6/2002 | Dicke |
| 6,428,259 B1 | 8/2002 | Yu |
| 6,616,391 B1 | 9/2003 | Druschel |
| 6,666,638 B2 | 12/2003 | Craven |
| 6,698,987 B1 | 3/2004 | Dicke |
| 6,699,421 B2 | 3/2004 | Shimizu et al. |
| 6,789,989 B2 | 9/2004 | Walther |

(Continued)

Primary Examiner — Roberta S Delisle
(74) Attorney, Agent, or Firm — Thompson Hine L.L.P.

(57) ABSTRACT

A multi-thread screw includes a head end, a shank and a tapered end. Both a high thread and a low thread begin on the tapered end and extend onto the shank. The tapered end of the thread may include a polygonal cross-sectional shape.

21 Claims, 13 Drawing Sheets

(56) References Cited

U.S. PATENT DOCUMENTS

| | | |
|---|---|---|
| 6,789,991 B2 | 9/2004 | Hsu |
| 6,926,484 B2 | 8/2005 | Kram et al. |
| 6,941,635 B2 | 9/2005 | Craven |
| 6,966,737 B2 | 11/2005 | McGovern et al. |
| 7,037,059 B2 | 5/2006 | Dicke |
| 7,101,133 B2 | 9/2006 | Dicke |
| 7,118,317 B2 | 10/2006 | Hofschneider |
| 7,255,523 B2 | 8/2007 | Laan |
| 7,293,947 B2 | 11/2007 | Craven |
| 7,334,976 B2 | 2/2008 | Dicke |
| 7,399,150 B2 | 7/2008 | Hofschneider |
| 7,604,445 B1 | 10/2009 | Dicke |
| 7,677,854 B2 | 3/2010 | Langewiesche |
| 7,682,119 B2 | 3/2010 | Chen |
| 7,682,182 B2 | 3/2010 | Kondo et al. |
| 7,695,228 B2 | 4/2010 | Craven |
| 7,699,569 B2 | 4/2010 | Su |
| 7,785,055 B2 | 8/2010 | Dicke et al. |
| 7,862,279 B2 | 1/2011 | Stiebitz et al. |
| 7,862,280 B2 | 1/2011 | Su |
| 7,988,396 B2 | 8/2011 | Weiss et al. |
| 8,104,248 B2 | 1/2012 | Gillis et al. |
| 8,137,042 B2 | 3/2012 | Severns |
| 8,348,571 B2 | 1/2013 | Shih |
| 8,348,575 B2 | 1/2013 | Walther |
| 8,360,702 B2 | 1/2013 | Yu |
| 8,382,414 B2 | 2/2013 | Vandenberg |
| 8,408,855 B2 | 4/2013 | Steibitz et al. |
| 8,430,618 B2 | 4/2013 | Baer |
| 8,480,342 B2 | 7/2013 | Steibitz et al. |
| 8,511,958 B2 | 8/2013 | Chang |
| 8,591,159 B2 | 11/2013 | Walther |
| 8,740,531 B2 | 6/2014 | Su et al. |
| 8,858,145 B2 | 10/2014 | Su et al. |
| 8,864,430 B2 | 10/2014 | Su |
| 8,864,431 B2 | 10/2014 | Su et al. |
| 8,944,734 B2 | 2/2015 | Su |
| 9,145,911 B2 | 9/2015 | Shih |
| 9,163,654 B2 | 10/2015 | Barenski, Jr. et al. |
| 2001/0038781 A1 | 11/2001 | Mallet et al. |
| 2007/0036632 A1 | 2/2007 | Lin |
| 2007/0269287 A1 | 11/2007 | Runge et al. |
| 2008/0031705 A1 | 2/2008 | Severns |
| 2010/0158634 A1 | 6/2010 | Walther |
| 2011/0064540 A1 | 3/2011 | Walther |
| 2012/0186067 A1 | 7/2012 | Walther |
| 2012/0207564 A1 | 8/2012 | Kochheiser |
| 2013/0039720 A1 | 2/2013 | Shih |
| 2014/0064878 A1 | 3/2014 | Su et al. |
| 2014/0178150 A1 | 6/2014 | Su et al. |
| 2015/0184685 A1 | 7/2015 | Su et al. |

SCREW-TYPE FASTENER

TECHNICAL FIELD

This application relates generally to threaded fasteners, and more particularly, to a multi-thread screw.

BACKGROUND

A typical screw configuration includes an elongated shank that extends between a driving head of the screw and a pointed end of the screw. At least part of the shank is helically threaded. Screws of this type have in many cases been designed specifically for beneficial performance and use in a single material (e.g., wood or metal or plastic or composite material). Some screw configurations have also been developed with an eye toward suitable performance in multiple different materials.

It would be desirable to provide a cost-effective screw multi-thread screw configuration useful in multiple different materials.

SUMMARY

In one aspect, a screw includes a head end, a shank and a tapered end. The head end includes a tool engaging part. The head end is located at one end of the shank and the tapered end is located at an opposite end of the shank. Multiple threads are formed along the screw including a high thread, a low thread and a set of intermediate threads. The high thread begins on the tapered end, extends onto the shank and terminates short of the head end. The high thread has a peripheral edge, at least a portion of the peripheral edge beginning on the tapered end and extending at least partly along the shank includes a series of notches formed therein. The low thread begins on the tapered end, extends onto the shank and terminates short of a termination point of the high thread. The low thread has a peripheral edge that defines a low thread major diameter on the shank that is less than a high thread major diameter defined on the shank by the peripheral edge of the high thread. A pitch of the low thread matches a pitch of the high thread. The set of intermediate threads have a common pitch and are located solely along the shank.

In another aspect, a screw includes a head end, a shank and a tapered end. The head end includes a tool engaging part. The head end is located at one end of the shank and the tapered end is located at an opposite end of the shank. Multiple threads are formed along the screw including a high thread, a low thread and a set of intermediate threads. The high thread begins on the tapered end, extends onto the shank and terminates at a first intermediate point between the tapered end and the head end. The high thread includes a first axial extent, a second axial extent and a peripheral edge. The first axial extent begins on the tapered end and extends onto the shank to a second intermediate point between the tapered end and the first intermediate point. The second axial extent begins at the second intermediate point and extends to the first intermediate point. The peripheral edge along the first axial extent includes a series of notches formed therein, and the peripheral edge along the second axial extent lacks any notches. The low thread begins on the tapered end, extends onto the shank and terminates at a third intermediate point between the tapered end and the second intermediate point. The low thread has a peripheral edge that defines a low thread major diameter on the shank that is less than a high thread major diameter defined on the shank by the peripheral edge of the high thread. A pitch of the low thread matches a pitch of the high thread. The set of intermediate threads is located solely along the shank, and each intermediate thread has a pitch that is at least six times the pitch of the high thread.

In a further aspect, a screw includes a head end, a shank and a tapered end. The head end includes a tool engaging part and is located at one end of the shank, and the tapered end is located at an opposite end of the shank. The tapered end includes a polygonal transverse cross-sectional shape formed in part by sidewalls of an axially extending cut. Multiple threads are formed along the screw including: a high thread that begins on the tapered end and extends onto the shank, the high thread having a peripheral edge, at least a portion of the peripheral edge beginning on the tapered end and extending at least partly along the shank includes a series of notches formed therein, and a low thread that begins on the tapered end and extends onto the shank, the low thread having a peripheral edge that defines a low thread major diameter on the shank that is less than a high thread major diameter defined on the shank by the peripheral edge of the high thread, wherein a pitch of the low thread matches a pitch of the high thread.

In yet another aspect, a screw includes a head end, a shank and a tapered end. The head end includes a tool engaging part, the head end located at one end of the shank and the tapered end located at an opposite end of the shank, wherein the tapered end includes a polygonal transverse cross-sectional shape formed in part by sidewalls of an axially extending cut. Multiple threads are formed along the screw including: a high thread that begins on the tapered end and extends onto the shank, the high thread having a peripheral edge, at least a portion of the peripheral edge beginning on the tapered end and extending at least partly along the shank includes a series of notches formed therein, and a low thread that begins on the tapered end and extends onto the shank, the low thread having a peripheral edge that defines a low thread major diameter on the shank that is less than a high thread major diameter defined on the shank by the peripheral edge of the high thread, wherein a pitch of the low thread matches a pitch of the high thread.

In still a further aspect, a screw includes head end, a shank and a tapered end. The head end includes: a tool engaging part having a circumscribing perimeter and an end face feature configured to be engaged by a tool for rotational driving of the screw; a frusto-conical part tapering from the tool engaging part to the shank, the frusto-conical part including a plurality of outwardly protruding spaced apart nibs, each nib having a first end proximate the tool engaging part and extends toward the shank to a second end that is spaced from the shank, each nib having a base width that varies from a first width at the first end and tapers to a lesser width at the second end, wherein the second width is no more than fifty percent of the first width, each nib having a leading face and a trailing face that meet to define a nib ridge, wherein the nib ridge has a height that varies from a first height at the first end and decreases to a second height at the second end, wherein the second height is no more than fifty percent of the first height, wherein an angle of intersection of the leading face with the surface of the frusto-conical part is between ninety degrees and one-hundred ten degrees and an angle of intersection of the trailing face with the surface of the frusto-conical part is between one-hundred thirty degrees and one-hundred forty degrees, wherein the leading face is substantially planar and the trailing face is substantially concave; wherein each nib extends both in a direction that includes a component parallel to an axis of the screw and a component radially inward toward a center axis of the screw. The shank extends from the head end to the tapered end. Multiple threads are formed along the screw including: a high thread that begins on the tapered end, extends onto the shank and terminates at a first intermediate point between the tapered end and the head end, the high thread having a first axial extent, a second axial extent and a peripheral edge, wherein the first axial extent begins on the tapered end and extends onto the shank to a second intermediate point between the tapered end and the first intermediate point, the second axial extent that begins at the second intermediate point and extends to the first intermediate point, the peripheral edge along the first axial extent including a series of notches formed therein, wherein the notches are formed substantially perpendicular to a helix angle of the high thread, wherein the peripheral edge along the second axial extent lacks any notches, wherein an axial length of the first axial extent is at least eighty percent of an axial length of the second axial extent; a low thread that begins on the tapered end, extends onto the shank and terminates at a third intermediate point between the tapered end and the second intermediate point, the low thread having a peripheral edge that defines a low thread major diameter on the shank that is no more than eighty percent of a high thread major diameter defined on the shank by the peripheral edge of the high thread, wherein a total axial length of the low thread is no more than sixty percent of a total axial length of the high thread, wherein a pitch of the low thread matches a pitch of the high thread; and a set of intermediate threads located solely along the shank, each intermediate thread having a pitch that is at least six times the pitch of the high thread, the set of intermediate threads including at least four intermediate threads, each intermediate thread intersecting the high thread in at least the first axial extent of the high thread, each intermediate thread beginning proximate the third intermediate point and extending to a fourth intermediate point that is between the first intermediate point and the second intermediate point, wherein an intermediate thread major diameter defined by a peripheral edge of each intermediate thread is less than the low thread major diameter, wherein an axial length of each intermediate thread is within ten percent of the axial length of the second axial extent of the high thread. An axially extending cut is located along the tapered end and defines both an inward recess in a core of the tapered end and a discontinuity of both the high thread and the low thread, wherein the cut forms a ninety degree channel in the core, wherein the cut extends from the tapered end into the shank to a fifth intermediate point located between the tapered end and the third intermediate point. A core of the tapered end is configured to have a polygonal transverse cross-section, the polygonal transverse cross-section includes at least five sides, including two sides that define a perimeter of the axially extending cut.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 5 shows an enlarged side elevation of the shank of the screw of FIGS. 1A-1C;

DETAILED DESCRIPTION

Figure 1A:
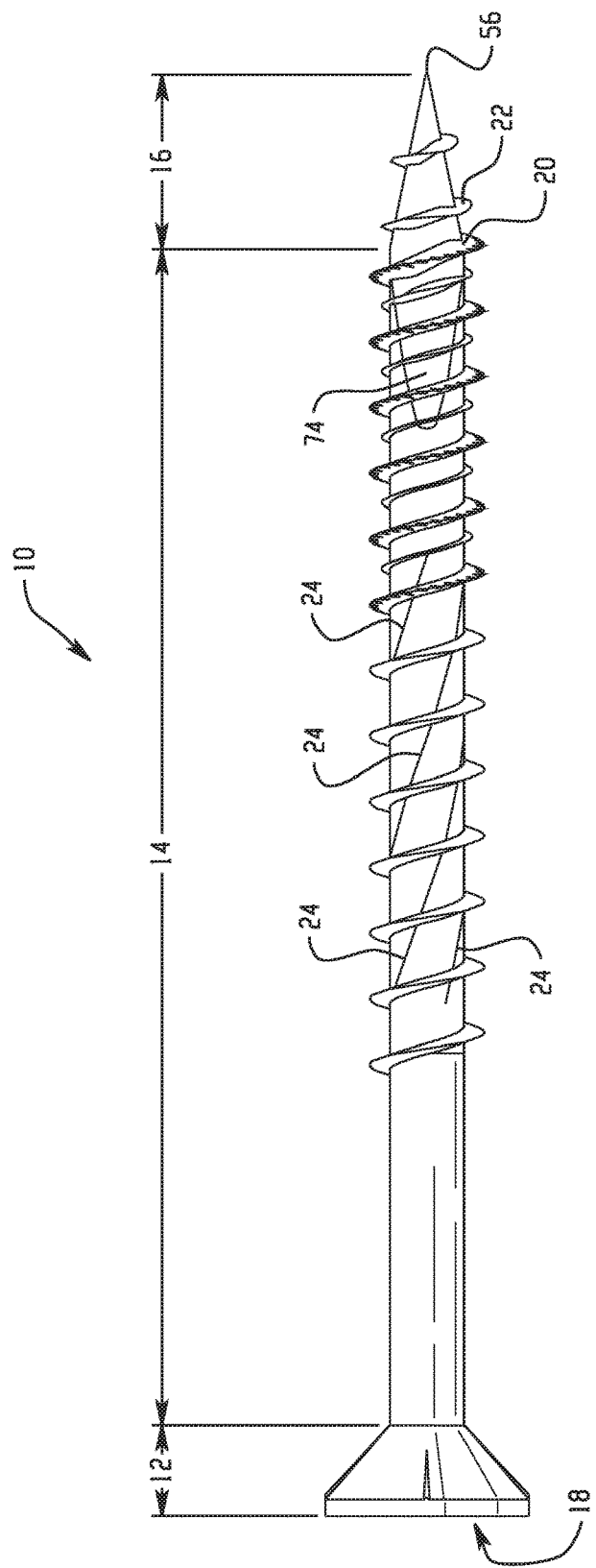
FIGS. 1A-1C show side elevation views of one embodiment of a screw.
Figure 1B:
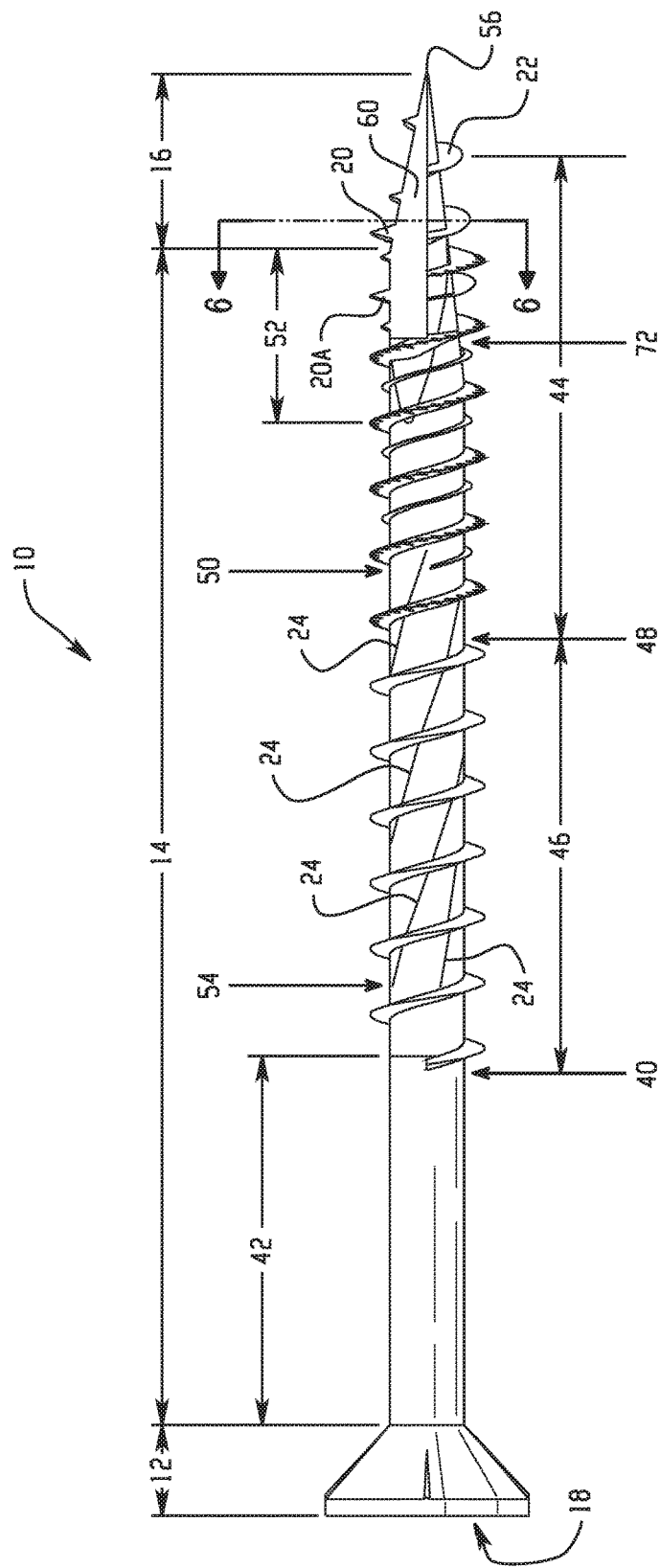
Figure 1C:
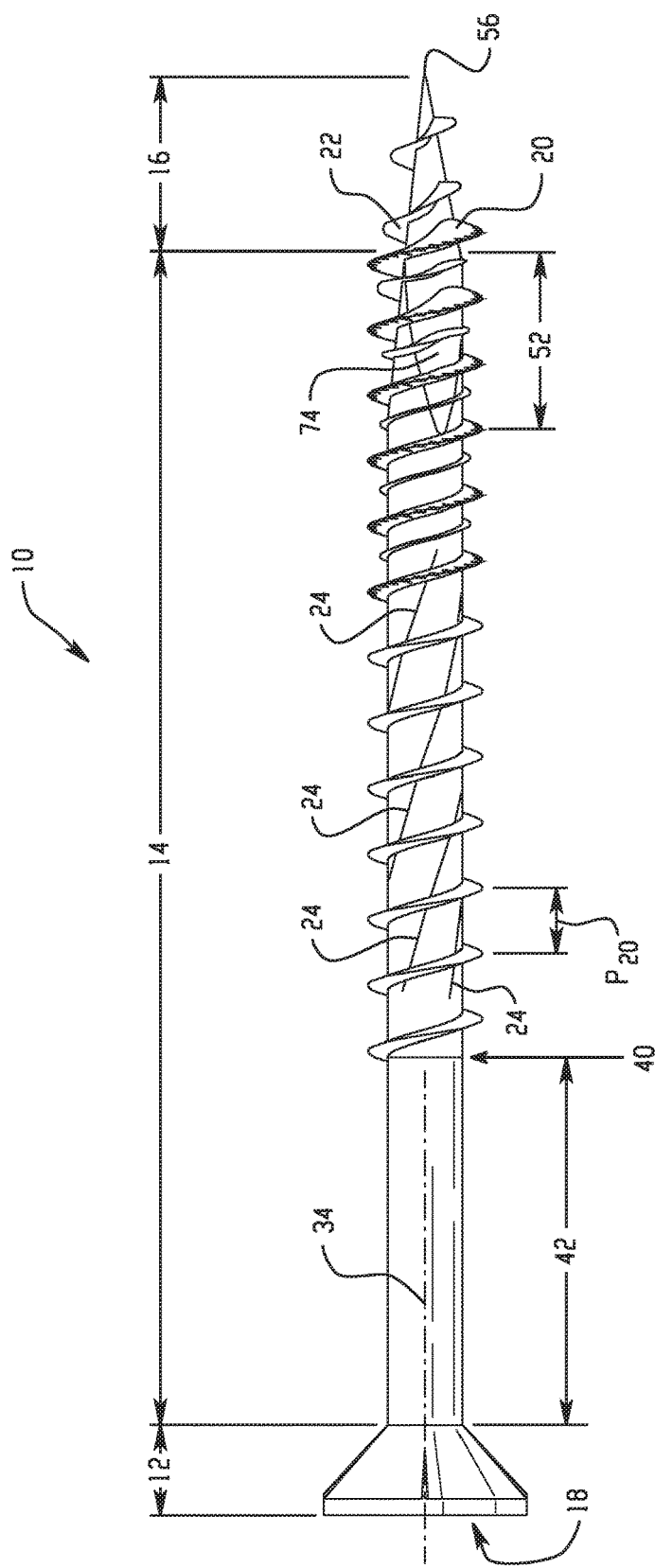
Figure 2:
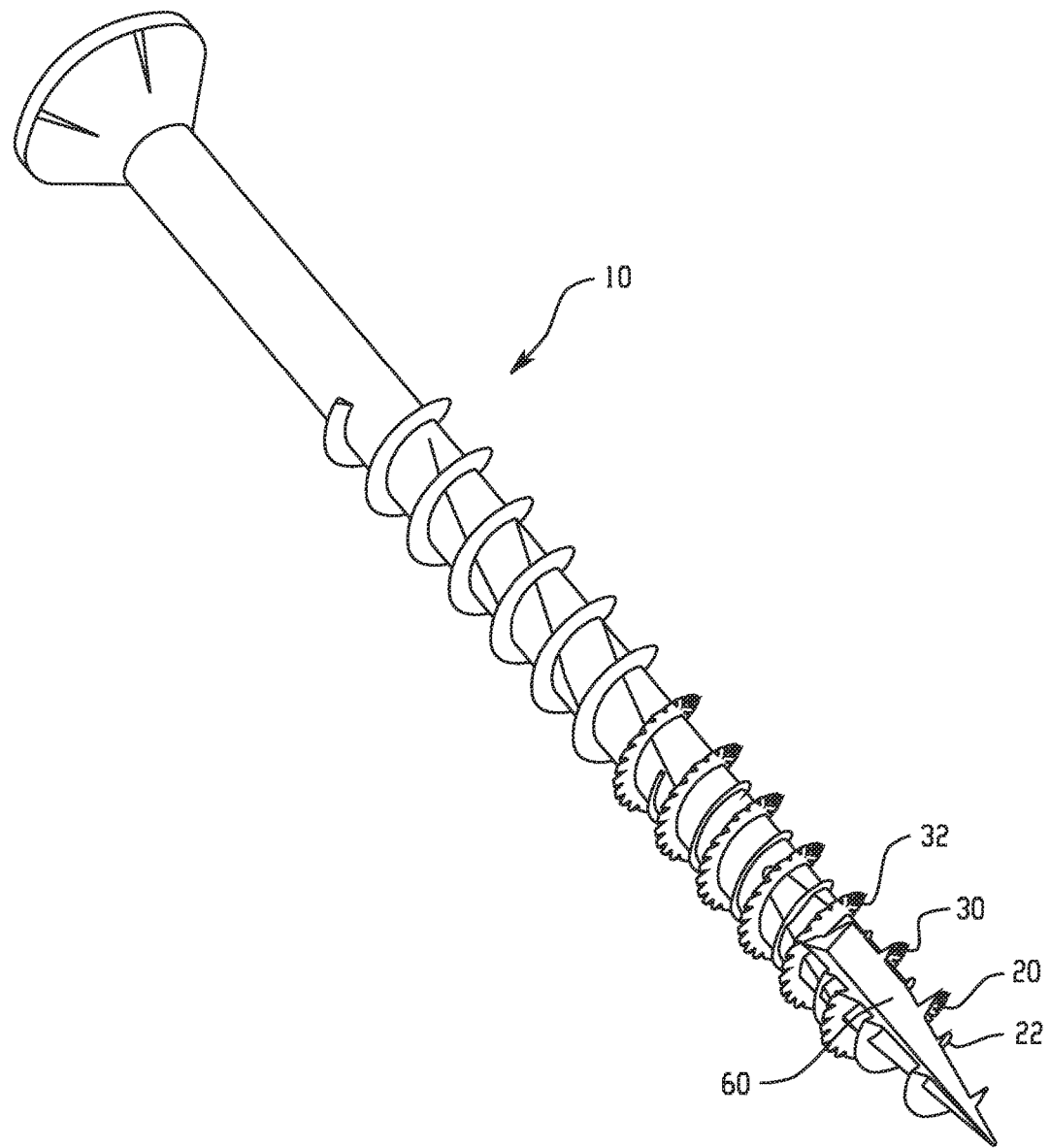
FIG. 2 shows a perspective view of the screw of FIGS. 1A-1C.

Referring to FIGS. 1A-1C, three side elevations of one embodiment of a screw 10 are shown from different rotational orientations of the screw. The screw includes a head end 12, a shank 14 and a tapered end 16. The head end 12 includes a tool engaging part 18 and is located at one end of the shank 14, and the tapered end 16 is located at an opposite end of the shank 14. Multiple threads are formed along the screw, as follows. A high thread 20 begins on the tapered end 14, extends onto the shank 14 and terminates short of the head end 12. A low thread 22 begins on the tapered end 16, extends onto the shank 14 and terminates short of the termination point of the high thread 20. The pitch of the high thread 20 and low thread 22 are the same. As use in this application the term "pitch" in reference to a thread means the distance between corresponding points on adjacent turns of the thread measured parallel to the lengthwise axis 34 of the screw (e.g., as shown by the pitch P20 for thread 20 in FIG. 1C). A set (e.g., two or more, such as three or four) of intermediate threads 24 are located solely along the shank 14. The intermediate threads 24 all have the same pitch, which is larger than the pitch of the high thread and low thread. By way of example, the pitch of the intermediate threads 24 may be at least six times the pitch of the high thread and low thread (e.g., at least eight times the pitch of the high thread and low thread, or ten times the pitch of the high thread and low thread). In the present application the term "pitch" as used in reference to a thread is the distance between corresponding points on adjacent instances of turns of the thread measured parallel to the lengthwise axis 34 of the screw (e.g., as shown by the pitch P20 for thread 20 in FIG. 1C).

Figure 3:
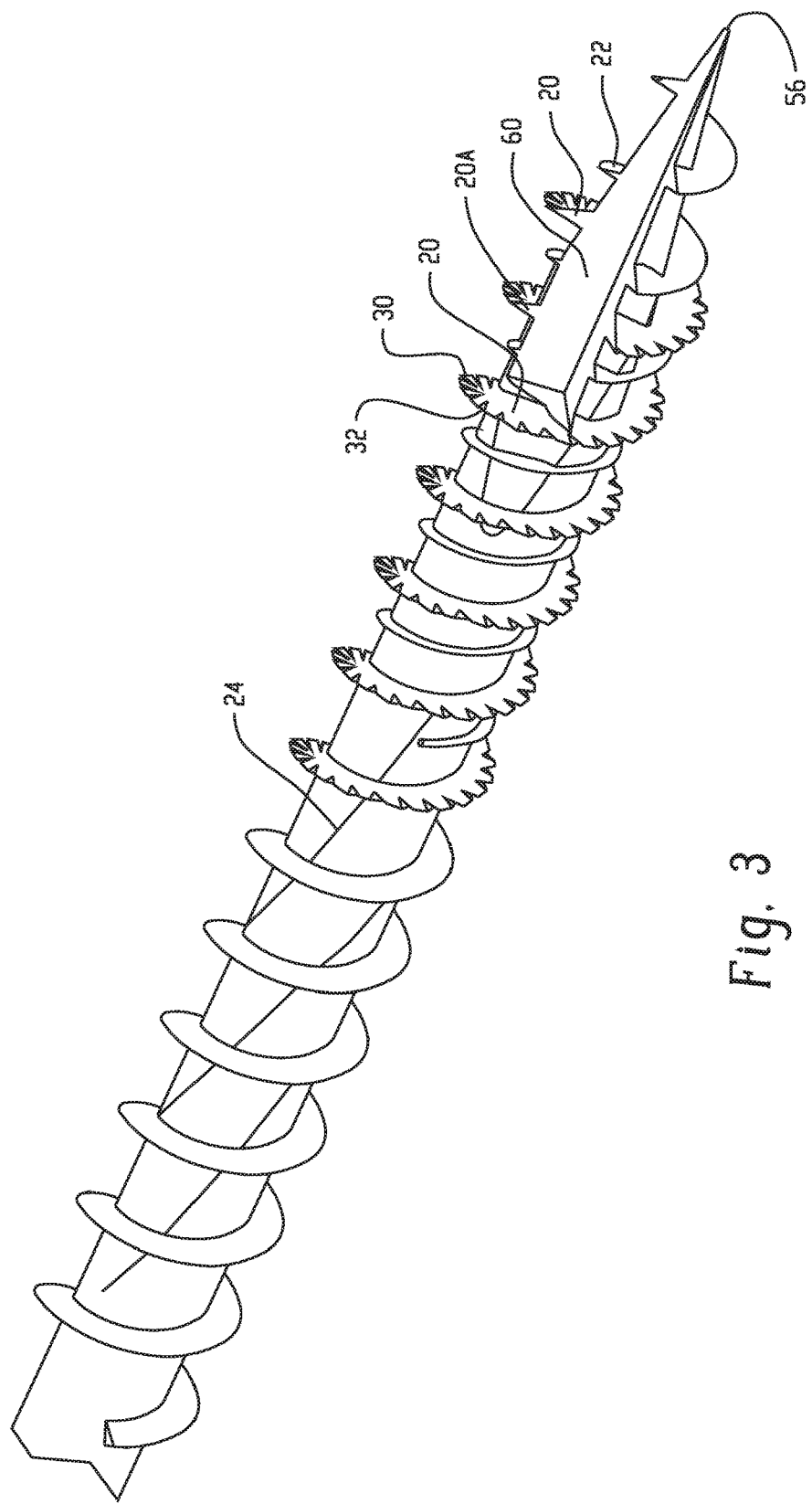
FIGS. 3 and 4 show enlarged partial perspective views of one end of the screw of FIG. 2.
Figure 4:
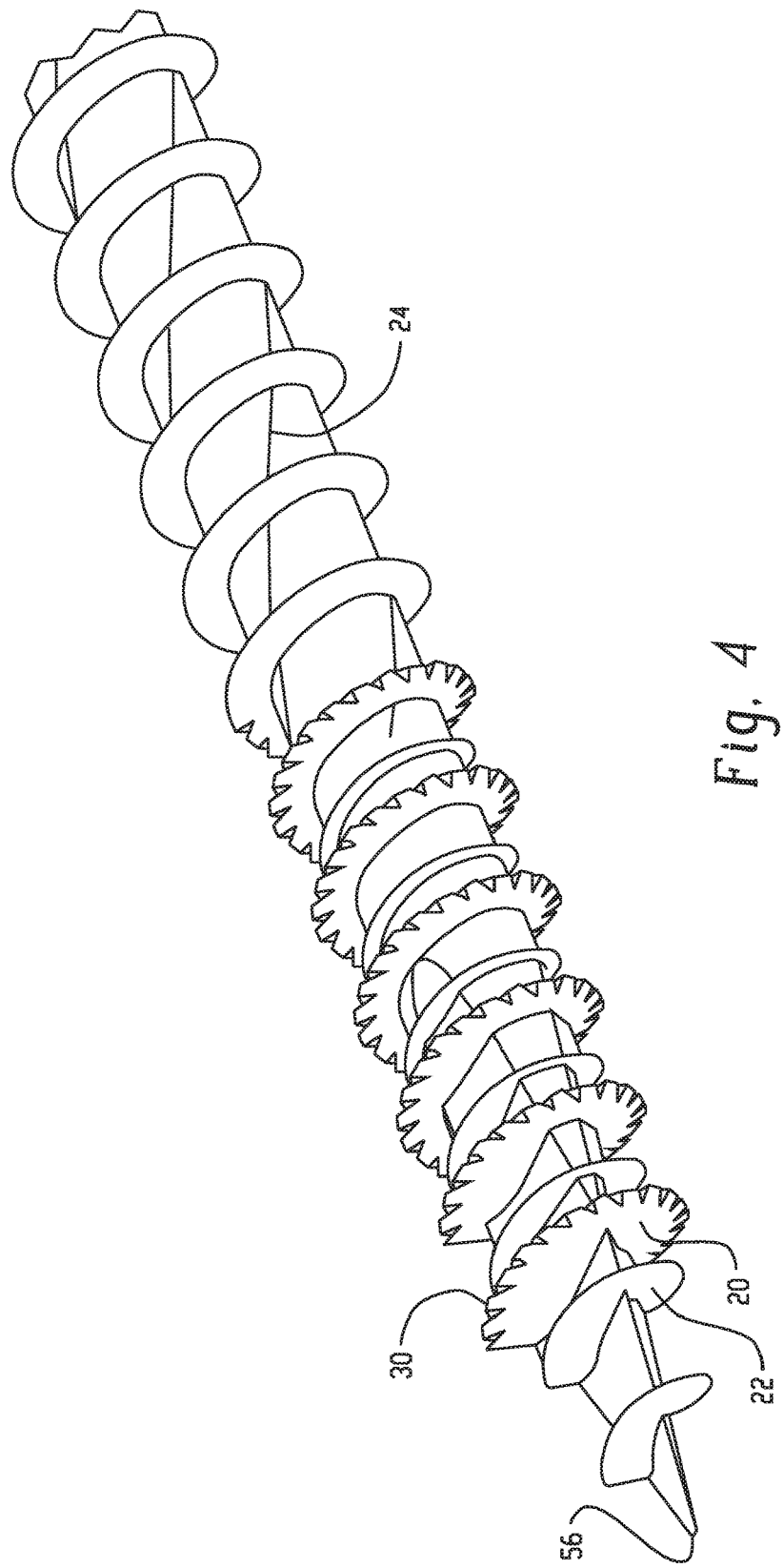

Notably, the high thread 20 has a peripheral edge 30, and at least a portion of the peripheral edge 30, which portion begins on the tapered end 16 and extends at least partly along the shank 14, includes a series of notches 32 formed therein. In one example, the notches may be formed as V-shaped notches that are oriented substantially perpendicular to the helix angle of the high thread. In this regard, in the context of the present application the term "V-shaped" as used in relation to thread peripheral edge notches means that the notch is formed as a V-shaped cutout along the peripheral edge; the orientation of a V-shaped notch is defined as the direction of the line formed by the base of the V forming the notch (which runs parallel to the sides of the V forming the notch); and the term "substantially perpendicular the helix angle" means oriented at 90 degrees relative to the helix angle, ±5 degrees for tolerance. The notches 30 are shown more clearly in FIGS. 3-5. The V-notches may enhance the cutting action of the high thread as the screw is rotated into a material. The V-notches may also reduce the resistance and torque to seat the screw.

Referring again to FIGS. 1A-1C, in the illustrated embodiment the high thread 20 extends from the tapered end 16 to an intermediate point 40 along the length of the screw that is spaced from the head end 12, resulting in a shank section 42 that lacks any threads. The high thread 20 includes a first axial extent 44 and a second axial extent 46, where the first axial extent 44 begins on the tapered end 16 and extends onto the shank 14 to an intermediate point 48 located between the tapered end 16 and the intermediate point 40, and the second axial extent 46 begins at intermediate point 48 and extends to intermediate point 40. The peripheral edge 30 along the first axial extent 44 includes the series of notches described above, and the peripheral edge along the second extent 46 is continuous and lacks any notches. In one example, an axial length of the first axial extent 44 is at least eighty percent of an axial length of the second axial extent 46. The axial length of first extent 44 may, in some cases, be greater than the axial length of second extent 46.

The low thread 22 begins on the tapered end, extends onto the shank and terminates at an intermediate point 50 that is between the tapered end 16 and the intermediate point 48. In one example, a total axial length of the low thread 22 is no more than sixty percent of a total axial length of the high thread 20. As best seen in FIG. 5, the low thread 22 has a peripheral edge 36 that defines a low thread major diameter D22 on the shank 14 that is less than the high thread major diameter D20 on the shank 14. In one example, the low thread major diameter D22 on the shank 14 may be no more than eighty-five percent (e.g., no more than eighty percent) of the high thread major diameter D20 on the shank 14. The combination Hi-Lo threads may provide a higher pull out force and strip-out resistance. Moreover, the combination Hi-Lo threads may also enhance the self-drilling characteristics of the screw (e.g., the screw drills itself in faster when rotated).

As also seen in FIG. 5, an intermediate thread major diameter D24, which is defined by a peripheral edge of each intermediate thread, is less than the low thread major diameter D22. By way of example, the intermediate thread major diameter D24 may be no more than ninety percent (e.g., no more than eighty-five percent) of the low thread major diameter D22. The surface of the shank 14 may form a right circular cylinder, at least along a majority of the length of the shank 14. The distal portion 52 of the shank may include flats as will be described in greater detail below, but such flats may also be absent.

Referring again to FIGS. 1A-1C, each intermediate thread 24 intersects the high thread 20 in at least the axial extent 44 of the high thread. Each intermediate thread 24 begins proximate intermediate point 50 and extends to an intermediate point 54 that is between intermediate point 48 and intermediate point 40. In the illustrated embodiment, intermediate point 54 is located closer to intermediate point 40 than to intermediate point 48. An axial length of each intermediate thread 24 may, by way of example, be within ten percent of the axial length of axial extent 46 of the high thread 20. The intermediate threads may help to clear the shank of debris during drive of the screw, reducing assembly torques into abrasive material.

The tapered end 16 of the screw defines a point 56 of the screw. In one embodiment, both the high thread 20 and the low thread begin respective locations that are spaced apart from the point 56 (i.e., neither thread extends all the way to the point 56). For example, where an axial length of the tapered end is about 0.20 inches, both threads could be spaced apart from the tip by about 0.10 inches. In another embodiment, one or both of the high thread 20 and low thread 22 begin at the point 56. However, in both cases a discontinuity of both the high thread and the low thread is created by an axially extending cut 60 that is located along the tapered end 16 to define both an inward recess in the core of the tapered end and multiple discontinuities of both the high thread and the low thread. In the illustrated embodiment (FIG. 3), the cut 60 extends from the point 56 of the tapered end into at least part of the shank 14. By way of example, the axially extending cut 60 may extend beyond the tapered end 16 and into the shank 14 a sufficient distance to create a discontinuity in the first full diameter turn 20A of the high thread 20 (i.e., the first turn of high thread 20 that has major diameter D20, when moving from along the high thread 20 from the tapered end 16 toward the head end 12). The illustrated cut 60 extends from the tapered end 16 into the shank to an intermediate point 72 (FIG. 1B) located between the tapered end 16 and intermediate point 50. Intermediate point 72 is located closer to tapered end 16 than to intermediate point 50.

Figure 6:
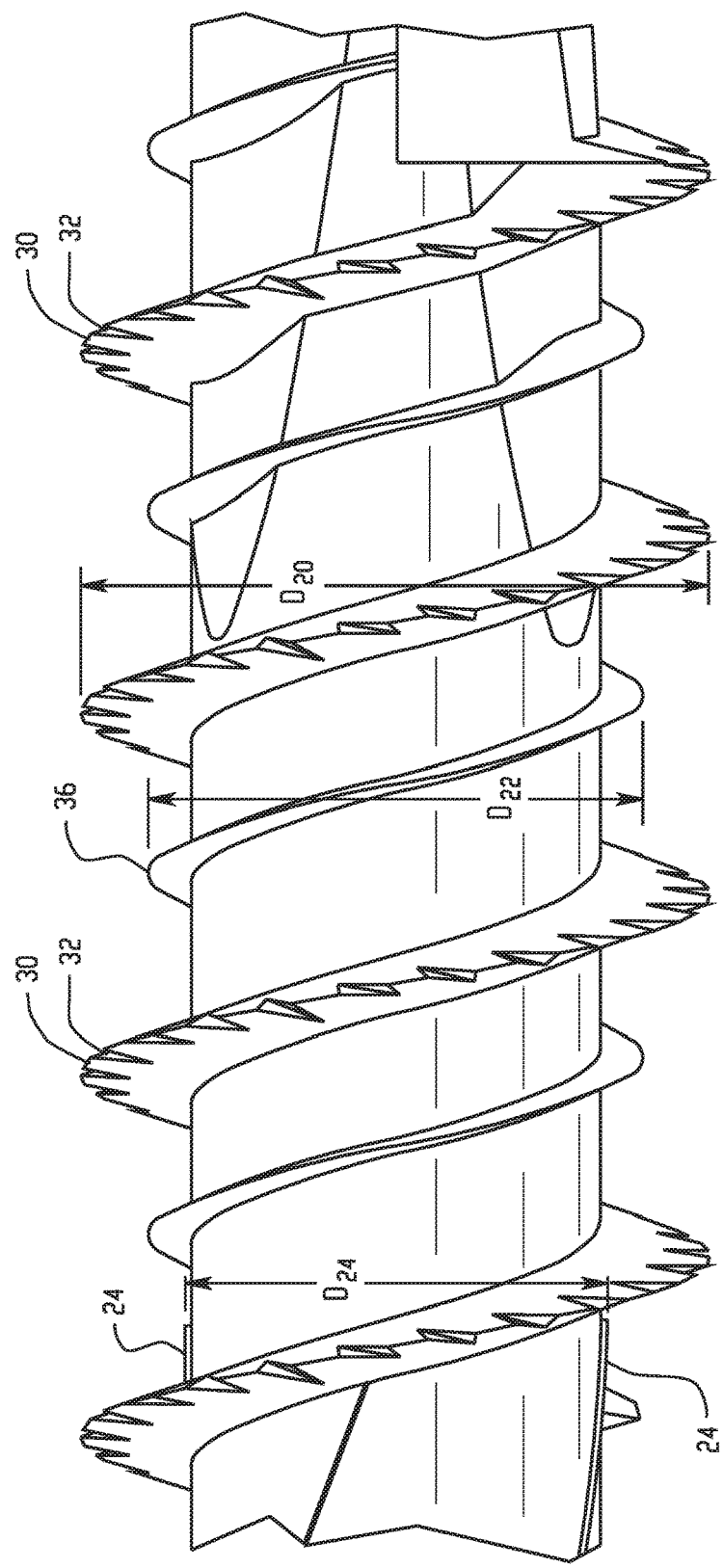
FIG. 6 is a cross-section taken along line 6-6 of FIG. 1B.

The core of the tapered end 16 is configured to have a polygonal transverse cross-section. In this application, the term "transverse cross-section" means a cross-section taken along a plane that extends perpendicular to the lengthwise axis 34 of the screw. In the illustrated embodiment, and as seen in the transverse cross-section of FIG. 6 (taken along line 6-6 of FIG. 1B), the polygonal transverse cross-section of the tapered end 16 includes five sides, including two sides 62, 64 that define a perimeter of the axially extending cut 60, and three sides 66, 68 and 70. In the absence of cut 60, sides 66, 68 and 70 would form a generally triangular cross-sectional shape at the tapered end. In the illustrated example, sides 64 and 62 are oriented substantially perpendicular to each other (i.e., 90 degrees, ±5 degrees for tolerance, relative to each other). As suggested in FIGS. 1A-1C, the flats forming the sides 66, 68 and 70 extend partly into the shank 14, per flat areas 74, for a limited axial distance as the core transitions from the polygonal transverse cross-section of the tapered end 16 to the right circular cylinder transverse cross-section of the majority of the length of the shank 14.

The tapered end of the screw provides easier insertion into substrate materials. The axially extending cut 60 provides a pilot hole cutting action that helps to reduce the need for pre-drilling. The triangular shape of the tapered end helps to displace material during the driving/drilling operation, and reduces radial forces, which helps prevent the splitting of woods when drilling close to the edge.

Figure 7:
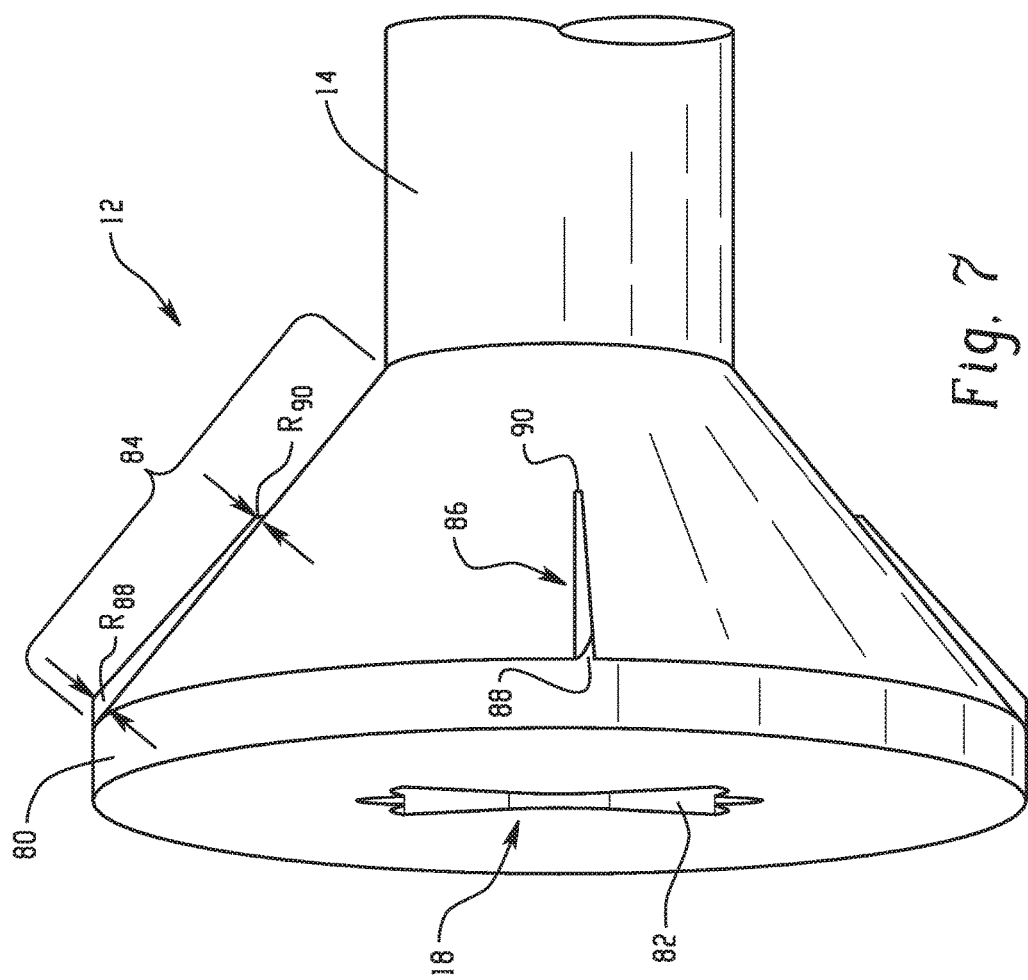
FIGS. 7-9 show enlarged partial perspective views of one end of the screw of FIGS. 1A-1C.
Figure 6:
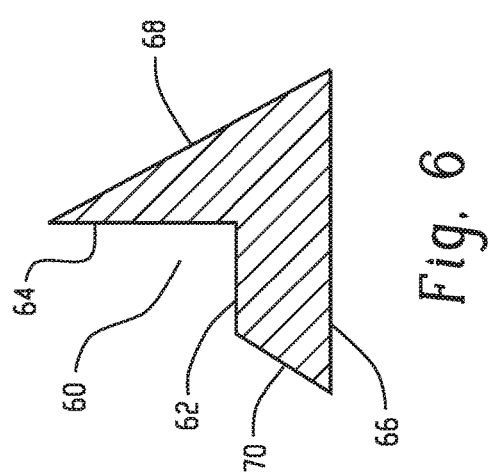
Figure 8:
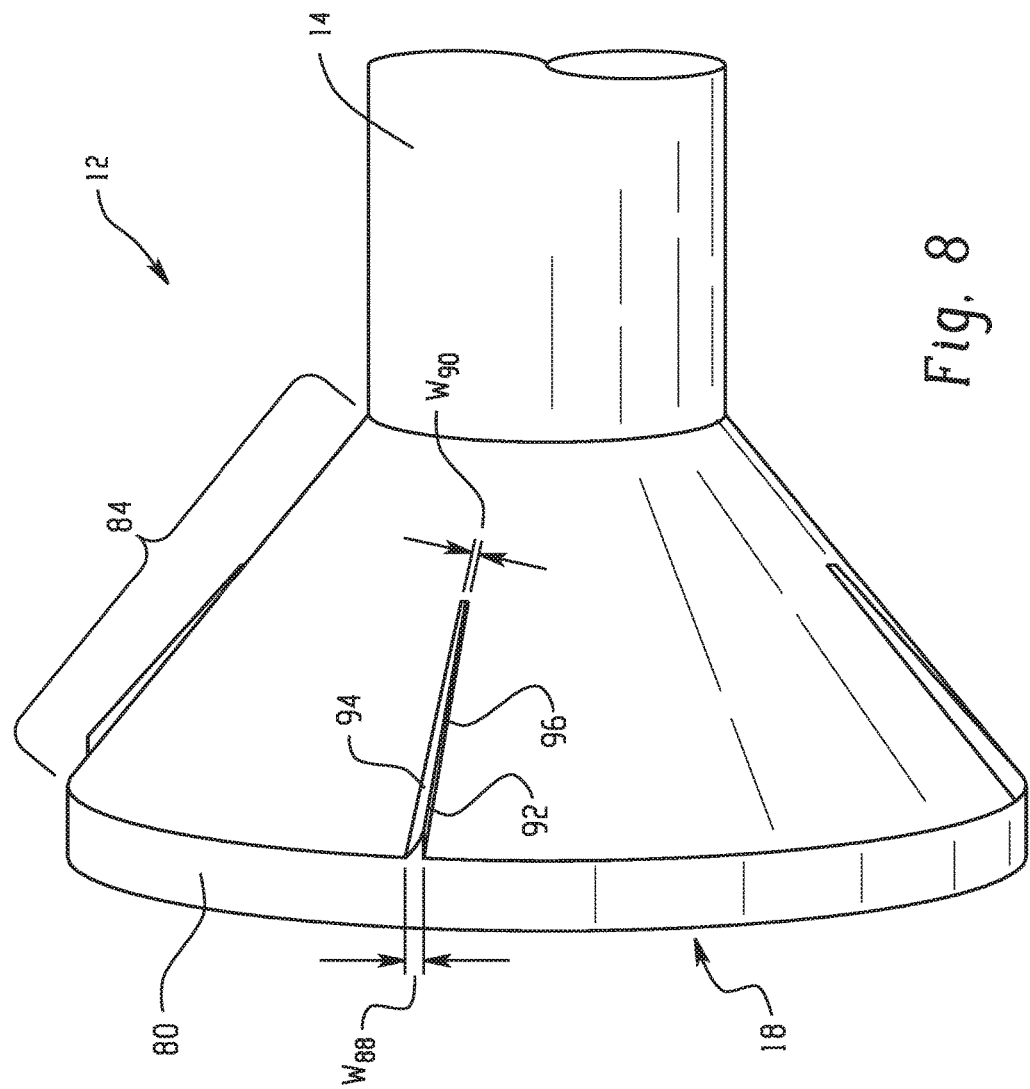
Figure 9:
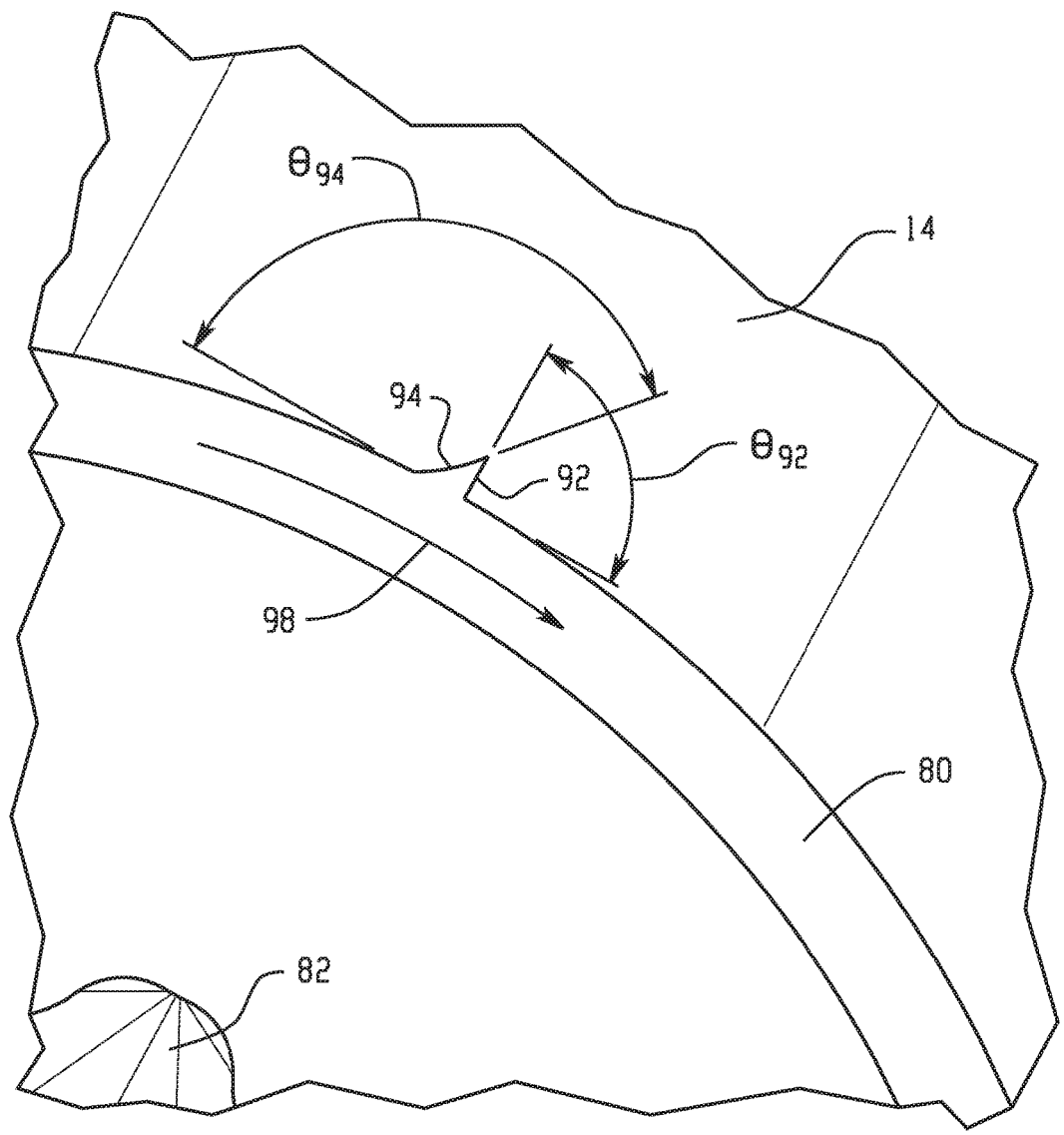

Referring now to FIGS. 7-9, the head end 12 includes tool engaging part 18 having a circumscribing perimeter 80. In the illustrated embodiment the tool engaging part includes an end face feature recess 82 configured to be engaged by a tool for rotational driving of the screw. However, in other embodiments the feature could, for example, be defined by a shape of the circumscribing perimeter 82. A frusto-conical part 84 tapers from the larger perimeter of the tool engaging part 18 to the smaller perimeter of the shank 14, and includes a plurality of outwardly protruding spaced apart nibs 86. In the illustrated embodiment, four nibs 86 are shown, with a ninety degree spacing between sequential nibs, but other numbers of nibs could be provided. Each nib 86 has one end 88 proximate the tool engaging part 18 and extends toward the shank 14 to an opposite end 90 that is spaced from the shank 14. As used herein the terminology "proximate the tool engaging part" when referring to the end of the nib means within an axial distance of 0.05 inches of the tool engaging part. As shown in the drawings, each nib extends both in a direction that includes a component parallel to an axis of the screw and a component radially inward toward a center axis of the screw Each nib 86 has a base width (i.e., a width at the surface of frusto-conical part 84) that varies from a larger width W88 at end 88 and tapers to a lesser width W90 at end 90. In one example, width W90 is no more than fifty percent of width W88. Each nib 86 has a leading face 92 and a trailing face 94 that meat to define a nib ridge 96. The leading face is defined as the nib face that faces toward the rotational direction 98 for driving the screw into a material (in this case the clockwise direction when looking at the end face of the head end of the screw). The nib ridge 96 has a height (measured orthogonal to the frusto-conical surface of tapered portion 84) that varies from a larger height R88 at end 88 and decreases to a lesser height R90 at end 90. In one example, height R90 is no more than fifty percent of height R88.

As shown, the configuration of leading face 92 and trailing face 94 may be different. In particular, an angle of intersection θ92 of the leading face 92 with a tangent of the surface of the frusto-conical part is between ninety degrees and one-hundred ten degrees, and an angle of intersection θ94 of the trailing face 94 with the surface of the frusto-conical part is between one-hundred thirty degrees and one-hundred forty degrees, but variations are possible. Also, the leading face 92 is substantially planar and the trailing face 94 is substantially concave.

The nibs 86 provide a self countersink operation prior to full seating of the screw. The nibs can also assist in locking the screw into place, increasing break away torque.

Figure 10:
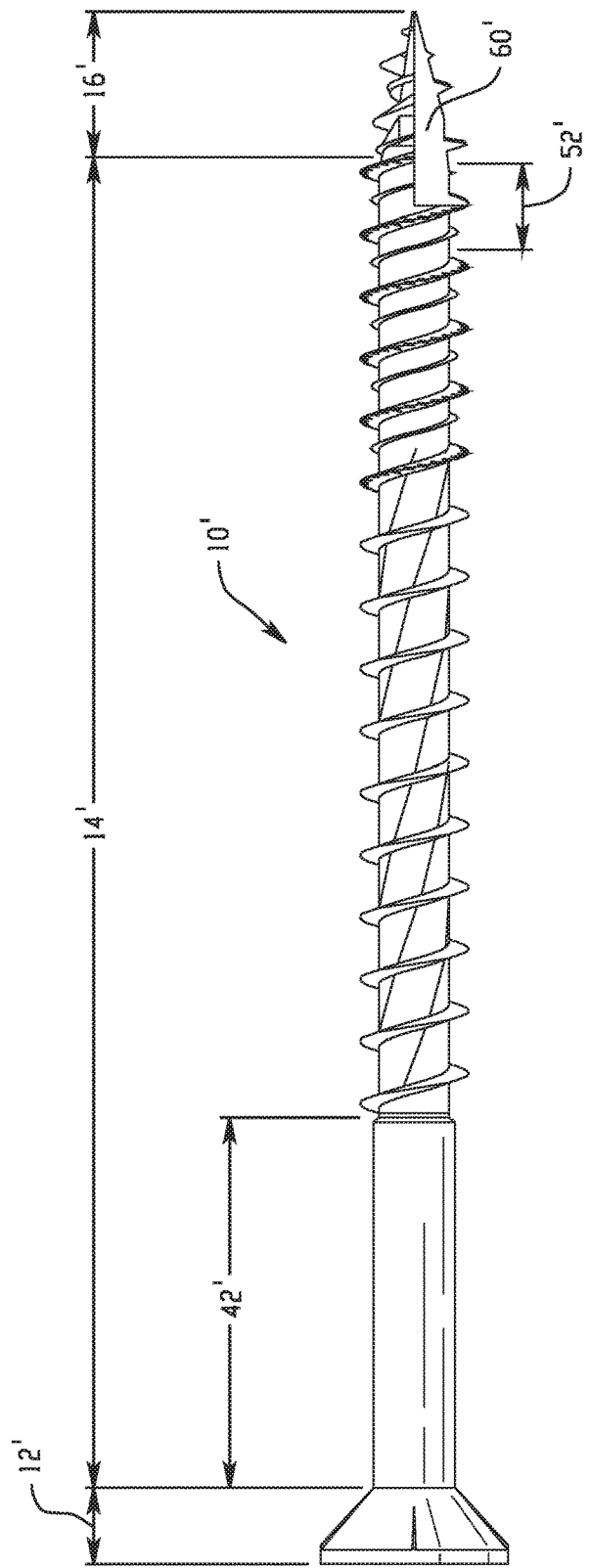
FIG. 10 shows a side elevation of an alternative embodiment of a screw.
Figure 11:
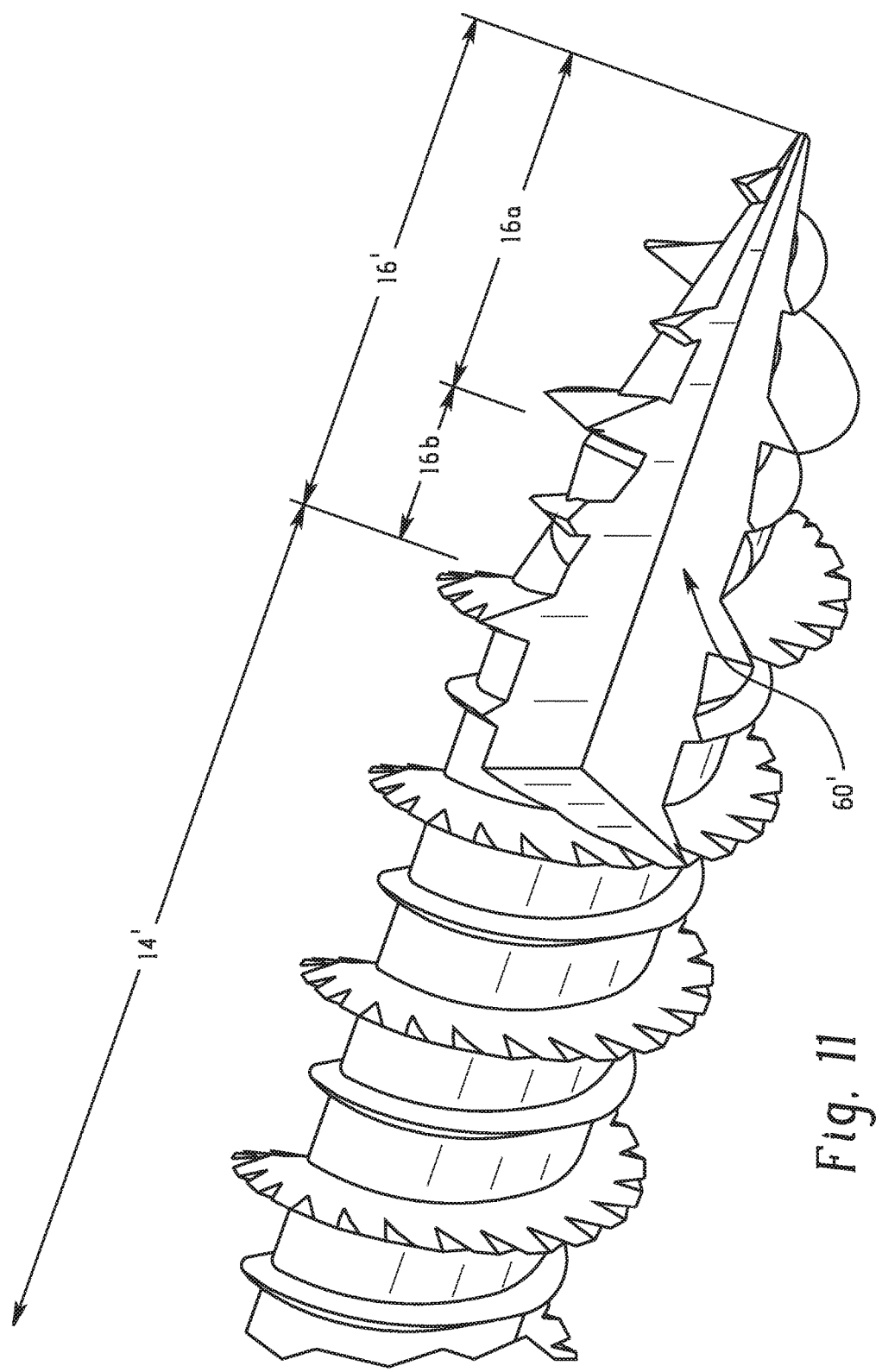
FIG. 11 shows an enlarged partial perspective of the screw of FIG. 10.
Figure 12:
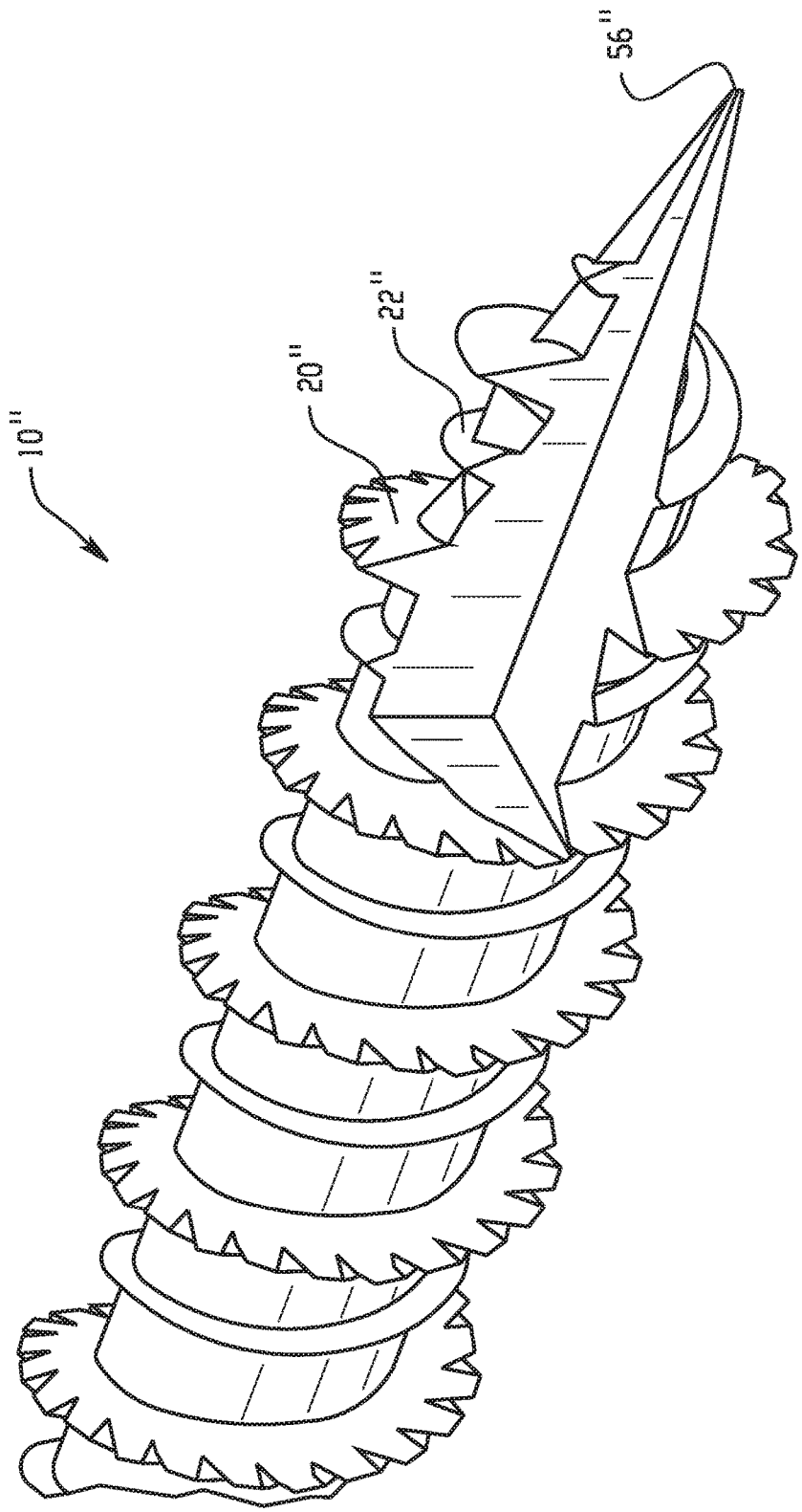
FIG. 12 shows an enlarged partial perspective of another embodiment.

Referring to FIGS. 10 and 11, the screw 10' includes head end 12', shank 14' and tapered end 16'. The unthreaded shank section 42' has a slightly larger diameter than the core of the threaded portion of the shank as shown. In addition, unlike screw 10 above, the distal portion 52' of the shank 14' proximate the tapered end 16' does not include any flats. Rather, the tapered end 16' includes a first section 16a' with polygonal transverse cross-sectional shape (i.e., three main sides and two sides formed by the axial cut) and a second section 16b' in which a transition from the polygonal shape to the right circular cylinder shape of the shank 14' is made. FIG. 12 shows an embodiment of a screw 10" in which both the high and low threads 20" and 22" start at locations that are more distinctly spaced from the point 56" of the screw.

It is to be clearly understood that the above description is intended by way of illustration and example only, is not intended to be taken by way of limitation, and that other changes and modifications are possible. For example, while certain relative dimensions have been provided by example above, variations are possible.

What is claimed is:

1. A screw, comprising:
    a head end, a shank and a tapered end,
    the head end including a tool engaging part, the head end located at one end of the shank and the tapered end located at an opposite end of the shank,
    wherein multiple threads are formed along the screw including:
        a high thread that begins on the tapered end, extends onto the shank and terminates short of the head end, the high thread having a peripheral edge, at least a portion of the peripheral edge beginning on the tapered end and extending at least partly along the shank includes a series of notches formed therein, and
        a low thread that begins on the tapered end, extends onto the shank and terminates short of a termination point of the high thread, the low thread having a peripheral edge that defines a low thread major diameter on the shank that is less than a high thread major diameter defined on the shank by the peripheral edge of the high thread, wherein a pitch of the low thread matches a pitch of the high thread.

2. The screw of claim 1 wherein the tapered end defines a point of the screw, the high thread begins at a location spaced apart from the point, and the low thread begins at a location spaced apart from the point.

3. The screw of claim 1 wherein the tapered end defines a point of the screw, the high thread begins at the point, and the low thread begins at the point.

4. The screw of claim 1 wherein,
    an axially extending cut is located along the tapered end and defines both an inward recess in a core of the tapered end and a discontinuity of both the high thread and the low thread.

5. The screw of claim 4 wherein the cut extends from the tapered end into at least part of the shank.

6. The screw of claim 5 wherein the core of the tapered end is configured to have a polygonal transverse cross-section along at least a portion of its length, the polygonal transverse cross-section includes at least three sides.

7. The screw of claim 5 wherein the core of the tapered end is configured to have a polygonal transverse cross-section along at least a portion of its length, the polygonal transverse cross-section includes at least five sides, including two sides that define a perimeter of the axially extending cut.

8. The screw of claim 7 wherein the two sides defining the axially extending cut are oriented perpendicular to each other.

9. The screw of claim 4 wherein the axially extending cut creates at least one discontinuity in the high thread on the tapered end and at least one discontinuity in the high thread on the shank, and the axially extending cut creates at least one discontinuity in the low thread on the tapered end and at least one discontinuity in the low thread on the shank.

10. A screw, comprising:
    a head end, a shank and a tapered end,
    the head end including a tool engaging part, the head end located at one end of the shank and the tapered end located at an opposite end of the shank,
    wherein multiple threads are formed along the screw including:
        a high thread that begins on the tapered end, extends onto the shank and terminates at a first intermediate point between the tapered end and the head end, the high thread having a first axial extent, a second axial extent and a peripheral edge, wherein the first axial extent begins on the tapered end and extends onto the shank to a second intermediate point between the tapered end and the first intermediate point, the second axial extent begins at the second intermediate point and extends to the first intermediate point, the peripheral edge along the first axial extent including a series of notches formed therein, and the peripheral edge along the second axial extent lacks any notches,
        a low thread that begins on the tapered end, extends onto the shank and terminates at a third intermediate point between the tapered end and the second intermediate point, the low thread having a peripheral edge that defines a low thread major diameter on the shank that is less than a high thread major diameter defined on the shank by the peripheral edge of the high thread, wherein a pitch of the low thread matches a pitch of the high thread.

11. The screw of claim 10 wherein an axially extending cut is located along the tapered end and defines both an inward recess in a core of the tapered end and a discontinuity of both the high thread and the low thread.

12. The screw of claim 11 wherein the cut forms a ninety degree channel in the core, wherein the cut extends from the tapered end into the shank to a fourth intermediate point located between the tapered end and the third intermediate point.

13. The screw of claim 12 wherein the fourth intermediate point is closer to the tapered end than to the third intermediate point.

14. The screw of claim 11 wherein the core of the tapered end is configured to have a polygonal transverse cross-section along at least a portion of its length, the polygonal transverse cross-section includes at least five sides, including two sides that define a perimeter of the axially extending cut.

15. A screw, comprising:
a head end, a shank and a tapered end,
the head end including a tool engaging part, the head end located at one end of the shank and the tapered end located at an opposite end of the shank, wherein the tapered end includes a polygonal transverse cross-sectional shape;
wherein multiple threads are formed along the screw including:
a high thread that begins on the tapered end and extends onto the shank, the high thread having a peripheral edge, at least a portion of the peripheral edge beginning on the tapered end and extending at least partly along the shank includes a series of notches formed therein, and
a low thread that begins on the tapered end and extends onto the shank, the low thread having a peripheral edge that defines a low thread major diameter on the shank that is less than a high thread major diameter defined on the shank by the peripheral edge of the high thread, wherein a pitch of the low thread matches a pitch of the high thread.

16. The screw of claim 15 wherein:
the polygonal transverse cross-section is formed in part by sidewalls of an axially extending cut.

17. The screw of claim 16 wherein:
the high thread terminates on the shank at a location short of the head end;
the low thread terminates on the shank at a location short of a termination point of the high thread;
the axially extending cut extends from the tapered end into at least part of the shank and defines both an inward recess in a core of the tapered end and a discontinuity of both the high thread and the low thread.

18. The screw of claim 16 wherein the polygonal transverse cross-section includes at least three sides.

19. The screw of claim 16 wherein the polygonal transverse cross-section includes at least five sides.

20. The screw of claim 15 wherein the polygonal transverse cross-section is triangular in shape.

21. The screw of claim 15 wherein the polygonal transverse cross-section includes at least three sides.

* * * * *